United States Patent
Morris et al.

(10) Patent No.: US 8,170,161 B2
(45) Date of Patent: May 1, 2012

(54) HYBRID SWITCHED-PHASED DIVERSITY SYSTEM AND METHOD

(75) Inventors: Daniel G. Morris, Ovid, MI (US); Nazar F. Bally, Sterling Heights, MI (US); Raed S. Shatara, Carmel, IN (US); Steven S. Langston, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 644 days.

(21) Appl. No.: 12/358,353

(22) Filed: Jan. 23, 2009

(65) Prior Publication Data

US 2010/0189204 A1 Jul. 29, 2010

(51) Int. Cl.
*H04B 7/08* (2006.01)
*H04B 17/02* (2006.01)
(52) U.S. Cl. .................. 375/347; 455/135
(58) Field of Classification Search .............. 375/267, 375/347; 455/132–135, 140, 142, 150.1, 455/188.1, 188.2
See application file for complete search history.

(56) References Cited

U.S. PATENT DOCUMENTS

| | | | | |
|---|---|---|---|---|
| 6,151,487 A * | 11/2000 | Kim et al. | ............. | 455/134 |
| 7,187,912 B2 * | 3/2007 | Ginzburg | ............. | 455/134 |
| 2005/0113038 A1 * | 5/2005 | Kasami et al. | ............. | 455/101 |
| 2005/0181755 A1 | 8/2005 | Hoshino et al. | | |
| 2005/0197086 A1 * | 9/2005 | Ogawa et al. | ............. | 455/277.1 |
| 2006/0009177 A1 * | 1/2006 | Persico et al. | ............. | 455/143 |
| 2007/0071148 A1 * | 3/2007 | Motoda | ............. | 375/347 |
| 2007/0142011 A1 | 6/2007 | Shatara | | |

FOREIGN PATENT DOCUMENTS

| EP | 1 564 909 | 7/2005 |
|---|---|---|
| EP | 1 798 871 | 6/2007 |

OTHER PUBLICATIONS

European Search Report dated Apr. 14, 2010.
Shatara, Raed S., "Dual Receiver with Phase and Switched Diversity for Background Processing and Reception Improvement" SAE International, Apr. 2008, (7 pages) ISBN: 9780768016338.
Shatara, Raed S., "Combined Switched and Phase Aligned Multi-Antenna Diversity System for Signal-Error-Reduction in Mobile Receiving Systems" University of Bundeswhr Munchen, 2003 (123 pages).

* cited by examiner

*Primary Examiner* — Young T. Tse
(74) *Attorney, Agent, or Firm* — Paul W. Thiede (57) ABSTRACT

A receiver system and method are provided, wherein the system includes a plurality of antenna elements, and a receiver device configured to emit an output based upon the received signal. The receiver device communicates a control signal that corresponds to a determined signal quality of the received signal. The receiver system also includes a switch system adapted to switch among the plurality of antenna elements in a plurality of modes, wherein the switch system includes a first switch device and a second switch device. Further, the system includes a controller that receives the control signal, wherein the controller commands the switch system to operate in a first mode utilizing the first switch device when the determined signal quality is above a threshold value, and the controller commands the switch system to operate in a second mode utilizing the second switch device when the determined signal quality is below a threshold value.

26 Claims, 6 Drawing Sheets

| | Switches | | | | |
|---|---|---|---|---|---|
| | $S_1$ | $S_2$ | $S_A$ | $S_P$ | $S_{Sum}$ |
| Switch mode: $A_1$ | Close | Open | Open | Open | Open |
| Switch mode: $A_2$ | Open | Close | Open | Open | Open |
| Phase Mode | Open | Open | Close | Close | Close |

| Voltage | Mode | Value |
|---|---|---|
| 0V | Switch | Antenna 1 |
| 1V | Switch | Antenna 2 |
| 2V–4V | Phase | $\phi = (V_{in}-2)/2 * 360°$ |

HYBRID SWITCHED-PHASED DIVERSITY SYSTEM AND METHOD

TECHNICAL FIELD

The present invention generally relates to a receiver system and method of receiving a signal, and more particularly, a receiver system and method of receiving a signal that switches between a plurality of modes.

BACKGROUND OF THE INVENTION

Multipath interference is generally caused when two or more signal rays of an original transmitted signal converge upon a receiving antenna of a receiver system at significantly different times. This misalignment or superposition of several delayed signals, which are generally replicas of the original signal, may cause distortion in audio recovered from the signals.

In various radio frequency (RF) receiver systems, antenna diversity has been implemented in conjunction with a frequency modulated (FM) receiver to reduce degraded reception performance caused by multipath interference. Typically, antenna diversity can been accomplished through the use of two or more uncorrelated antennas. Conventional antenna diversity reception from mobile communication systems has been achieved by a number of different implementations. For example, antenna diversity has been accomplished with equal gain combiner (EGC) systems, maximal ratio combiner (MRC) systems, and antenna diversity systems, such as the adaptive reception system (ARS).

EGC and MRC systems typically utilize signals from all antennas through a variety of combining techniques that attempt to optimize the certain characteristics of the received signals. In a switched antenna diversity system, only one antenna is generally utilized for reception at any instant in time and, thus, the non-selected antennas do not contribute to the demodulated signal. The EGC and MRC systems generally may provide superior performance; however, they also tend to be more expensive to implement and may require multiple receiver analog front ends.

Typically, vehicles are equipped with an antenna for receiving radio signals. One example of such an antenna is a mast antenna, which extends from the exterior body of the vehicle. Generally, the mast antenna often interferes with the desired styling of the vehicle, and the mast antenna's protrusion makes it susceptible to damage.

An alternative to the mast antenna is placing the antenna within glass on the vehicle, such as a windshield of the vehicle. Whether the single antenna is a mast antenna, an in-glass antenna, or other type of antenna, a single antenna typically has inherent limitations under certain conditions, such as those with fading and multipath signal interference resulting from an obstruction, which can be caused by the presence of a building, a mountain, or another vehicle. Furthermore, in-glass antennas typically are susceptible to fading and multipath signal interference due to their gain, their directivity, and their polarization properties. There have been several techniques developed using multiple antennas for receiving radio signals to reduce the effects of such fading and interference.

One exemplary technique is scanning/selection or switching diversity. The scanning/selection or switching diversity technique operates on the premise that if one antenna on the vehicle is receiving a poor signal, another antenna may be receiving a better signal. Typically, the system either compares the signals that are being received by the system's multiple antennas to ascertain which antenna is receiving the better quality signal, or the system evaluates the signal being received by a single antenna to determine a quality of the signal and simply switches to another antenna if the current signal is designated as unacceptable. However, the switching transients caused by switching between antennas can be audible under some circumstances, and since only one antenna is typically used at any point in time, the system may provide only marginal improvement during fringe reception when compared to single antenna systems.

The EGC technique generally combines signals received by the antennas in an antenna array by correcting for the phase differences between antennas, then adding the signals pictorially. No adjustments are made to the signals for any difference in the gains of the input signals because only the phases of the input signals are adjusted for alignment in an equal-gain system. However, it is possible that the signal-to-noise ratio may be less than optimal. For example, if two inputs are combined, and one of those inputs contains mostly noise, the combined signal is likely to be of lower quality than the single non-corrected signal. In such a situation, it would have been ideal to use only the signal from the antenna that was not mostly noise.

Another technique is the MRC technique. In the MRC technique, the input signals are generally adjusted according to the detected phase thereof, the magnitudes of the input signals are adjusted according to the detected phase thereof, and the magnitudes of the input signals are adjusted to yield the maximum signal-to-noise ratio. Thus, a signal that is corrupted with noise does not degrade the overall performance of the system. However, the maximal-ratio combining technique is generally very complex, typically, due to the hardware having multiple receivers plus the algorithm for combining the multiple signals. Additionally, the cost of implementing such a system can be prohibitive in some environments.

SUMMARY OF THE INVENTION

According to one aspect of the present invention, a receiver system is provided that includes a plurality of antenna elements configured to receive a transmitted signal, and a receiver device in communication with the plurality of antenna elements, and configured to emit an output based upon the received signal, wherein the receiver device communicates a control signal that corresponds to a determined signal quality of the received signal. The receiver system also includes a switch system adapted to switch among the plurality of antenna elements to electrically connect at least one of the plurality of antenna elements to the receiver device in a plurality of modes, wherein the switch system includes a first and second switch device, wherein the first switch device is configured to electrically connect at least one of the plurality of antenna elements when the switch system is in a first mode, and a second switch device is configured to electrically connect at least one of the plurality of antenna elements with the receiver device when the switch system is in a second mode. Further, the receiver system includes a controller that receives the control signal, wherein the controller commands the switch system to operate in a first mode utilizing the first switch device when the determined signal quality is above a threshold value, and the controller commands the switch system to operate in a second mode utilizing the second switch device when the determined signal quality is below a threshold value.

According to another aspect of the present invention, a method of receiving at least one signal is provided that includes the steps of receiving a signal by at least one of a plurality of antenna elements, determining a quality of the received signal, and communicating a control signal corresponding to the determined signal quality. The method further includes the steps of switching among the plurality of antenna elements for operating in a plurality of modes, operating in a first mode of the plurality of modes based upon the control signal when the determined signal quality is above at threshold value, and operating in a second mode of the plurality of modes based upon the control signal when the determined signal quality is below a threshold value.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DETAILED DESCRIPTION

Figure 1:
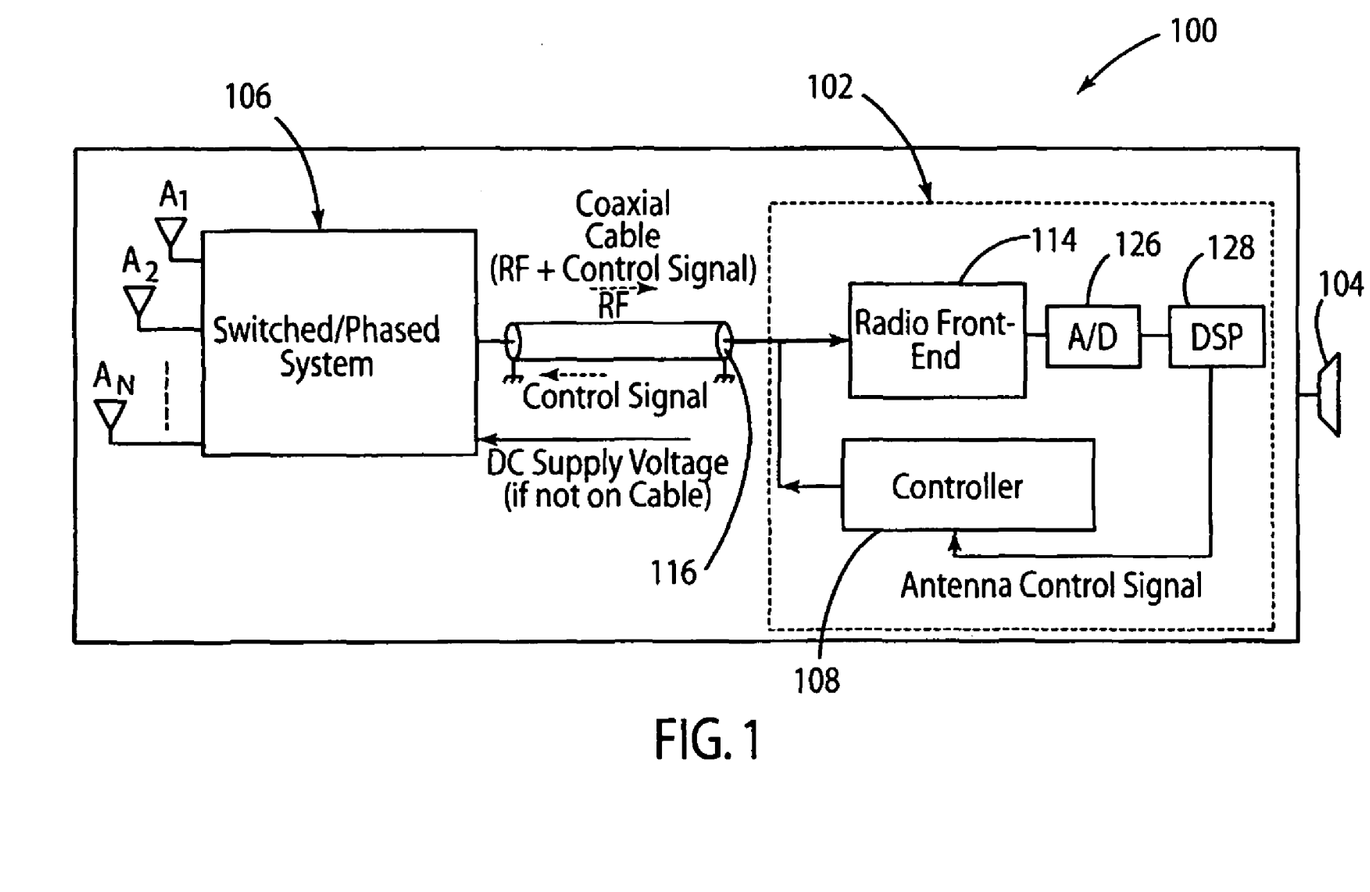
FIG. 1 is a block diagram of a receiver system, in accordance with one embodiment of the present invention.
Figure 2A:
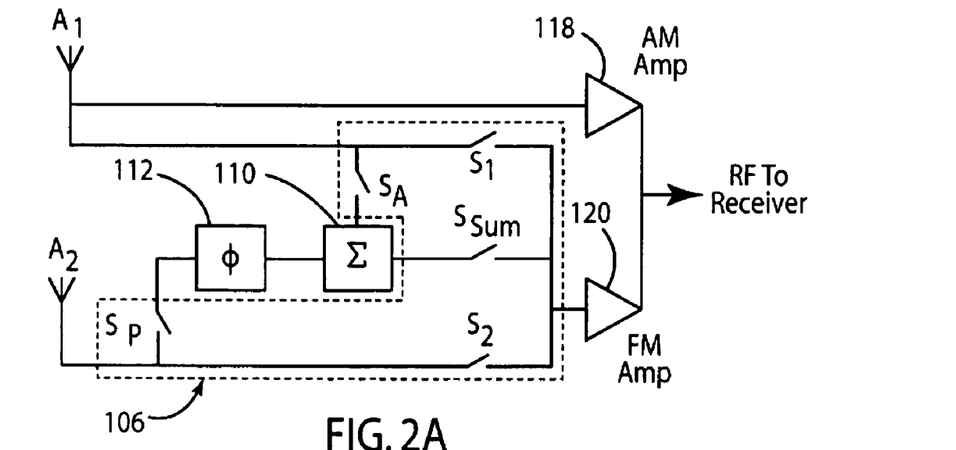
FIG. 2A is a schematic diagram of a receiver system, in accordance with one embodiment of the present invention.
Figure 2B:
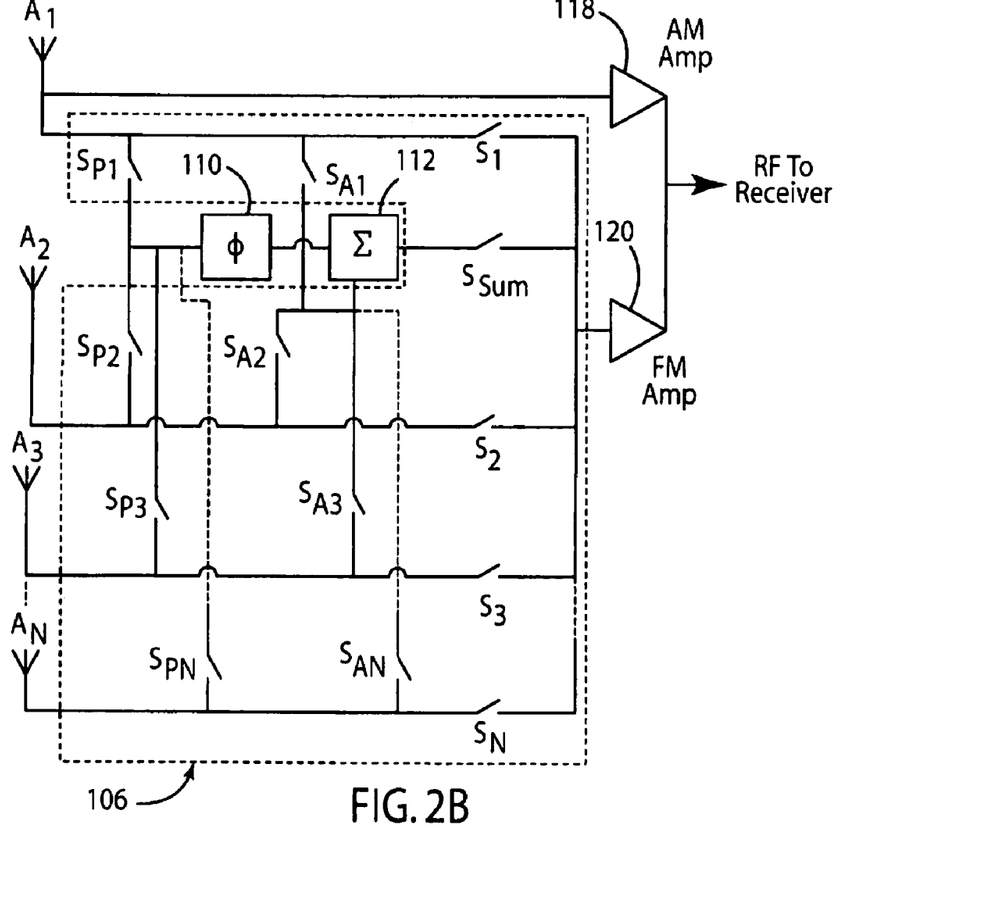
FIG. 2B is a schematic diagram of a receiver system, in accordance with another embodiment of the present invention.

In regards to FIGS. 1, 2A, and 2B, a receiver system is generally shown at reference identifier 100. The receiver system 100 includes a plurality of antenna elements (e.g., $A_1$, $A_2$, ... $A_N$) configured to receive a transmitted signal, and a receiver device generally indicated at 102. The receiver device 102 is in communication with the plurality of antenna elements $A_1$, $A_2$, ... $A_N$, and is configured to emit an output 104 based upon the received signal, wherein the receiver device 102 communicates a control signal that corresponds to a determined signal quality of the received signal. The control signal can correspond to the determined signal quality in that the control signal commands switching among the antenna elements $A_1$, $A_2$, ... $A_N$ as a function of the determined signal quality.

According to one embodiment, the output 104 can be an audio output, a video output, data output, the like, or a combination thereof. The plurality of antenna elements can be described herein as a first antenna element $A_1$ and a second antenna element $A_2$ for explanation purposes, and not for purposes of limitation. It should be appreciated by those skilled in the art that two or more antenna elements $A_1$, $A_2$, ... $A_N$ can be utilized in the receiver system 102.

The receiver system 100 further includes a switch system, such as a switched/phased system generally indicated at 106. The switched/phased system 106 is adapted to switch among the plurality of antenna elements $A_1$, $A_2$, ... $A_N$ to electrically connect at least one of the plurality of antenna elements $A_1$, $A_2$, ... $A_N$ to the receiver device 102 in a plurality of modes. Thus, an antenna element or a combination of antenna elements of the plurality of antenna elements $A_1$, $A_2$, ... $A_N$ is electrically connected to the receiver device 102 by the switch device, such that the receiver device 102 receives a signal received by the antenna element, which is the reference antenna element.

Typically, the switched/phased system 106 includes a first switch device configured to switch among the plurality of antenna elements $A_1$, $A_2$, ... $A_N$ when the switched/phased system 106 is operating in a first mode, wherein the first switch device includes a plurality of switches $S_1$, $S_2$, ... $S_N$. The switched/phased system 106 further includes a second switch device configured to electrically connect at least one of the plurality of antenna elements $A_1$, $A_2$, ... $A_N$ with the receiver device 102 when the switched/phased system 106 is in a second mode, wherein the second switch device can include a plurality of switches $S_{P1}$, $S_{P2}$, ... $S_{PN}$.

Figure 3:
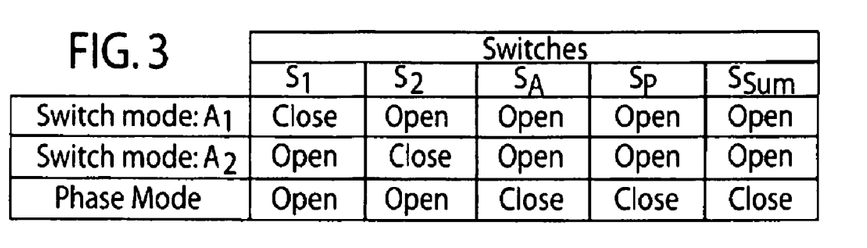
FIG. 3 is a chart illustrating various combinations of switches in different states, in accordance with one embodiment of the present invention.
Figure 4A:
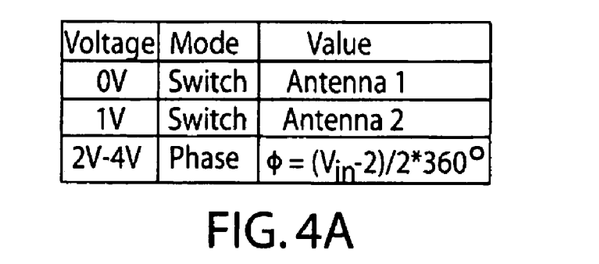
FIG. 4A is a chart illustrating operating conditions of a receiver system, in accordance with one embodiment of the present invention.
Figure 4B:
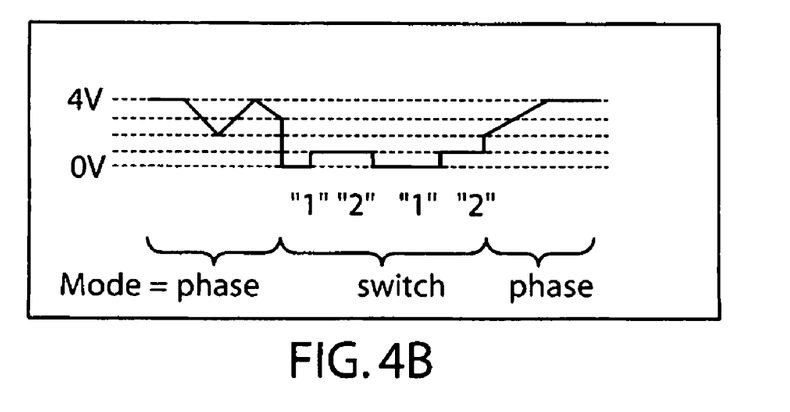
FIG. 4B is a timing diagram illustrating operating conditions of a receiver system, in accordance with one embodiment of the present invention.
Figure 5:
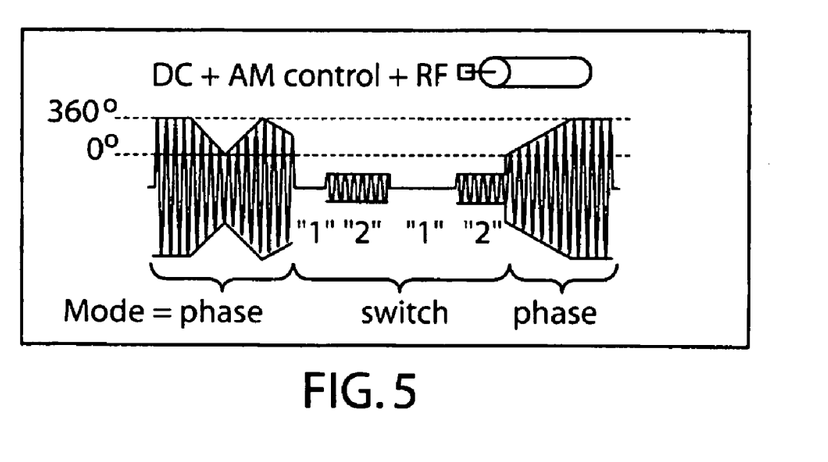
FIG. 5 is timing diagram illustrating operating conditions of a receiver system, in accordance with one embodiment of the present invention.

The receiver system 100 is shown in FIG. 2A as including first and second antenna elements $A_1$, $A_2$, and the switched/phased system 106 that has the first switch device $S_1$,$S_2$, the second switch device $S_P$, a switch $S_{sum}$ associated with a summer 112, and an antenna element switch $S_A$ that is associated with one of the first antenna element $A_1$, according to one embodiment. Typically, the antenna element switch $S_A$ is electrically connected to an input node of the summer 112 that is not phased shifted, which enables the first and second antenna elements $A_1$, $A_2$ to be phased aligned. Thus, as illustrated in FIGS. 2A and 3, when the switched/phased system 106 is operating in the first mode (e.g., switched diversity mode) with respect to the first antenna element $A_1$, switch $S_1$, is closed while switch $S_2$, antenna element switch $S_A$, switch $S_P$, and switch $S_{sum}$ are open. When the switched/phased system 106 is operating in the first mode (e.g., switched diversity mode) with respect to the second antenna element $A_2$, switch $S_2$ is open, while switch $S_1$, antenna element switch $S_A$, switch $S_P$, and switch $S_{sum}$ are closed. As further illustrated in FIGS. 2A and 3, when the switched/phased system 106 is operating in the second mode (e.g., phased diversity mode), switches $S_1$ and $S_2$ are open, while antenna element switch $S_A$, switch $S_P$, and switch $S_{sum}$ are closed.

According to an alternate embodiment, as shown in FIG. 2B, the receiver system 100 can include any number of a plurality of antenna elements $A_1$, $A_2$, $A_3$, ... $A_N$, and the switched/phased system 106 can include the first switch device $S_1$, $S_2$, $S_3$, ... $S_N$, the second switch device $S_{P1}$, $S_{P2}$, ... $S_{PN}$, the switch $S_{sum}$, and antenna element switches $S_{A1}$, $S_{A2}$, $S_{A3}$, ... $S_{AN}$ that are each associated with one of the plurality of antenna elements $A_1$, $A_2$, $A_3$, ... $A_N$. Typically, the antenna element switches $S_{A1}$, $S_{A2}$, $S_{A3}$, ... $S_{AN}$ are electrically connected to an input node of the summer 112 that is not phase shifted, which enables any two antenna elements $A_1$, $A_2$, $A_3$, ... $A_N$ to be phased aligned. By way of explanation and not limitation, the first antenna element $A_1$ can be phased aligned with the second antenna element $A_2$, or the first antenna element $A_1$ can be phased aligned with the third antenna element $A_3$. Thus, each antenna element $A_1$, $A_2$, $A_3$, ... $A_N$ can be electrically connected to a phase shifter 110 and the summer 112 through the antenna element switches $S_{A1}$, $S_{A2}$, $S_{A3}$, ... $S_{AN}$, the first switch device $S_1$, $S_2$, $S_3$, ... $S_N$, and the second switch device $S_{P1}$, $S_{P2}$, ... $S_{PN}$.

The receiver system 100 can further include a controller 108 that receives the control signal, wherein the controller 108 commands the switched/phased system 106 to operate in a first mode utilizing the first switch device $S_1$, $S_2$, ... $S_N$ when the determined signal quality is above a threshold value, and the controller 108 commands the switched/phased system 106 to operate in a second mode utilizing a second switch device $S_{P1}$, $S_{P2}$, ... $S_{PN}$ when the determined signal quality is below a threshold value, as illustrated in FIG. 3 and described in greater detail herein. Typically, the switch $S_{sum}$ (FIGS. 2A and 2B) is closed when the switched/phased system 106 is operating in the second mode (e.g., phase diversity mode).

According to one embodiment, when the switched/phased system 106 is operating in a first mode, the receiver system 100 is operating in a switch diversity mode, and when the switched/phased system 106 is operating in a second mode, the receiver system 100 is operating in a phase diversity mode. Exemplary systems of methods for operating in switch diversity mode and phase diversity mode are disclosed in U.S. Patent Application Publication No. 2008/0214133 entitled "SYSTEM AND METHOD OF A STEREO RECEIVING SYSTEM," and U.S. Patent Application Publication No. 2009-0270059 entitled "RECEIVER SYSTEM AND METHOD FOR RECEIVING SIGNALS," respectively, of which the entire disclosures are hereby incorporated herein by reference.

When the switched/phased system 106 is operating in the phase diversity mode, the second switch device $S_{P1}$, $S_{P2}$, ... $S_{PN}$ is in an open position, and the first switch device $S_1$, $S_2$, ... $S_N$ alternatively actuates a plurality of switches between open and closed positions. Typically, the alternative actuation of the plurality of switches of the first switch device $S_1$, $S_2$, ... $S_N$ results in a single antenna element (e.g., a first antenna element $A_1$) of the plurality of antenna elements $A_1$, $A_2$, ... $A_N$ to be electrically connected to the receiver device 102, such that the signal processed by the receiver device 102 is being received by the electrically connected antenna element. Further, when the plurality of switches of the first switch device $S_1$, $S_2$, ... $S_N$ alternatively switch when a reference signal received by a reference antenna element of the plurality of antenna elements $A_1$, $A_2$, ... $A_N$ is below a second threshold value. Thus, the second threshold value that is used for a comparison with the reference signal when the switch system is operating in the switch diversity mode differs from the threshold value used for determining if the switch 106 is to be operating in the first or second modes, according to one embodiment.

Typically, the reference antenna element when the switch system is operating in the first mode, is the antenna element that is currently electrically connected to the receiver device 102, such that the receiver device 102 is processing the signal received by the reference antenna element. Thus, the reference antenna element can be any of the plurality of antenna elements $A_1$, $A_2$, ... $A_N$. When the reference signal (e.g., the signal received by the reference antenna) quality is determined to be below the second threshold value, the plurality of switches alternatively switch, and a signal received by a currently selected antenna element of the plurality of antenna elements is compared to the reference signal, such that it can be determined if a signal received by one of the other of the plurality of antenna elements is capable of receiving a higher quality signal. When the signal received by the currently selected antenna element is better than the reference signal, then the currently selected antenna element becomes the reference antenna element.

According to one embodiment, when the switched/phased system 106 is operating in the second mode, the first switch device $S_1$, $S_2$, ... $S_N$ is in an open position, and the second switch device $S_{P1}$, $S_{P2}$, ... $S_{PN}$ is in an closed position. A second switch device $S_{P1}$, $S_{P2}$, ... $S_{PN}$ electrically connects at least a portion of the plurality of antenna elements $A_1$, $A_2$, ... $A_N$ and the receiver device 102, such that a signal is received by the electrically connected at least a portion of a plurality of antenna elements $A_1$, $A_2$, ... $A_N$. A control signal can be produced to reduce an error in the received signal, such that the control signal is communicated to the phase shifter 110 that aligns a phase between the signals received by the at least a portion of the plurality of antenna elements $A_1$, $A_2$, ... $A_N$, according to one embodiment.

Typically, the reference antenna element when the switch system is operating in the second mode is a single antenna element (e.g., the first antenna element $A_1$) or a combination of antenna elements (e.g., the first antenna element $A_1$, and the second antenna element $A_2$) that is currently electrically connected to the receiver device 102, such that the receiver device 102 is processing the signal received by the reference antenna element. Thus, the reference antenna element can be any one or combination of the plurality of antenna elements $A_1$, $A_2$, ... $A_N$.

In reference to FIGS. 2A and 2B, the receiver system 100 includes the phase shifter 110 and the summer 112. Typically, the phase shifter 110 and summer 112 are utilized to process the received signal when the switch system 100 is operating in a second mode (e.g., phase diversity mode). Thus, the phase shifter 110 can be received from the controller 108, such that the phase shifter aligns a phase between the received signals. The receiver system 100 can also include other circuitry or components, such as, but not limited to, a radio front end 114 (FIG. 1), a cable 116 (FIG. 1) electrically connecting the switched/phased system 106 and the receiver 102, an amplitude modulator (AM) amplifier 118 (FIG. 2), a frequency modulator (FM) amplifier 120 (FIG. 2), an analog-to-digital converter (A/D) 126, a digital signal processor (DSP) 128, the like, or a combination thereof, according to one embodiment.

With respect to FIGS. 1, 4A, 4B, and 5, the threshold value of the control signal for determining if the switched/phased system 106 is to operate in the first mode is approximately two volts (2V), such that if a voltage potential of a control signal communicated from the controller 108 is below approximately two volts (2V), then the switched/phased system 106 operates in the first mode, and if a voltage potential of the control signal is above approximately two volts (2V), then the switched/phased system 106 operates in the second mode.

According to an alternate embodiment, the exemplary value of two volts (2V) is a reference value, such that the actual voltage potential of the control signal varies between four volts (4V) and eight volts (8V). It should be appreciated by those skilled in the art that the range of voltage potentials and actual value of voltage potentials can be arbitrary, while the reference voltage potential with respect to the threshold value is used to make the determination. It should also be appreciated by those skilled in the art that one of "below" and "above" as described herein with respect to a threshold value can include the situation of the reference value being equal to the threshold value, according to one embodiment.

Figure 6:
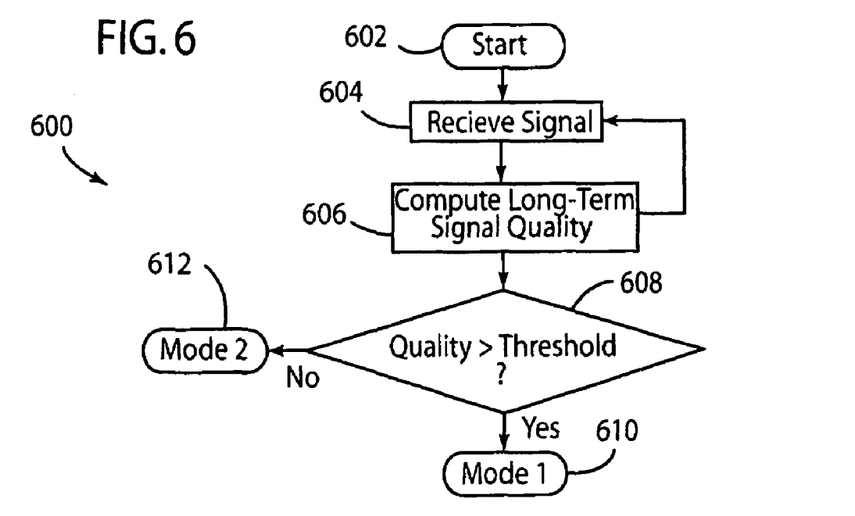
FIG. 6 is a flow chart illustrating a method of receiving a signal, in accordance with one embodiment of the present invention.

In regards to FIGS. 1, 2A, 2B, and 6, a method of receiving a signal is generally shown, particularly in, FIG. 6 at reference identifier 600. The method 600 starts at step 602, and proceeds to step 604, wherein a signal is received. Typically, the signal is received by an antenna element configuration of a plurality of antenna elements $A_1, A_2, \ldots A_N$, wherein the antenna element configuration is at least a portion of the antenna elements that are electrically connected to the receiver device 102. At step 606, a long-term signal quality is computed. According to one embodiment, the long-term signal quality is computed by an average of multiple diversity loops. At decision step 608, it is determined if the computed signal quality is greater than a threshold value. If it is determined at decision step 608 that the signal quality is greater than the threshold value, then the method 600 proceeds to step 610, wherein the switched/phased system 106 operates in the first mode. The threshold value utilized in step 608 can be different than the threshold value of the control signal. However, if it is determined at decision step 608 that the signal quality is not greater than the threshold value, then the method 600 proceeds to step 612, wherein the switch system 106 operates in the second mode. Thus, the method 600 can be a hybrid diversity monitor method, and the system 100 can be a hybrid diversity monitor system. It should be appreciated by those skilled in the art that the method 600 is continuously performed to determine if the switched/phased system 106 should operate in the first mode or the second mode, while the receiver system 100 is in an operating condition.

Figure 7:
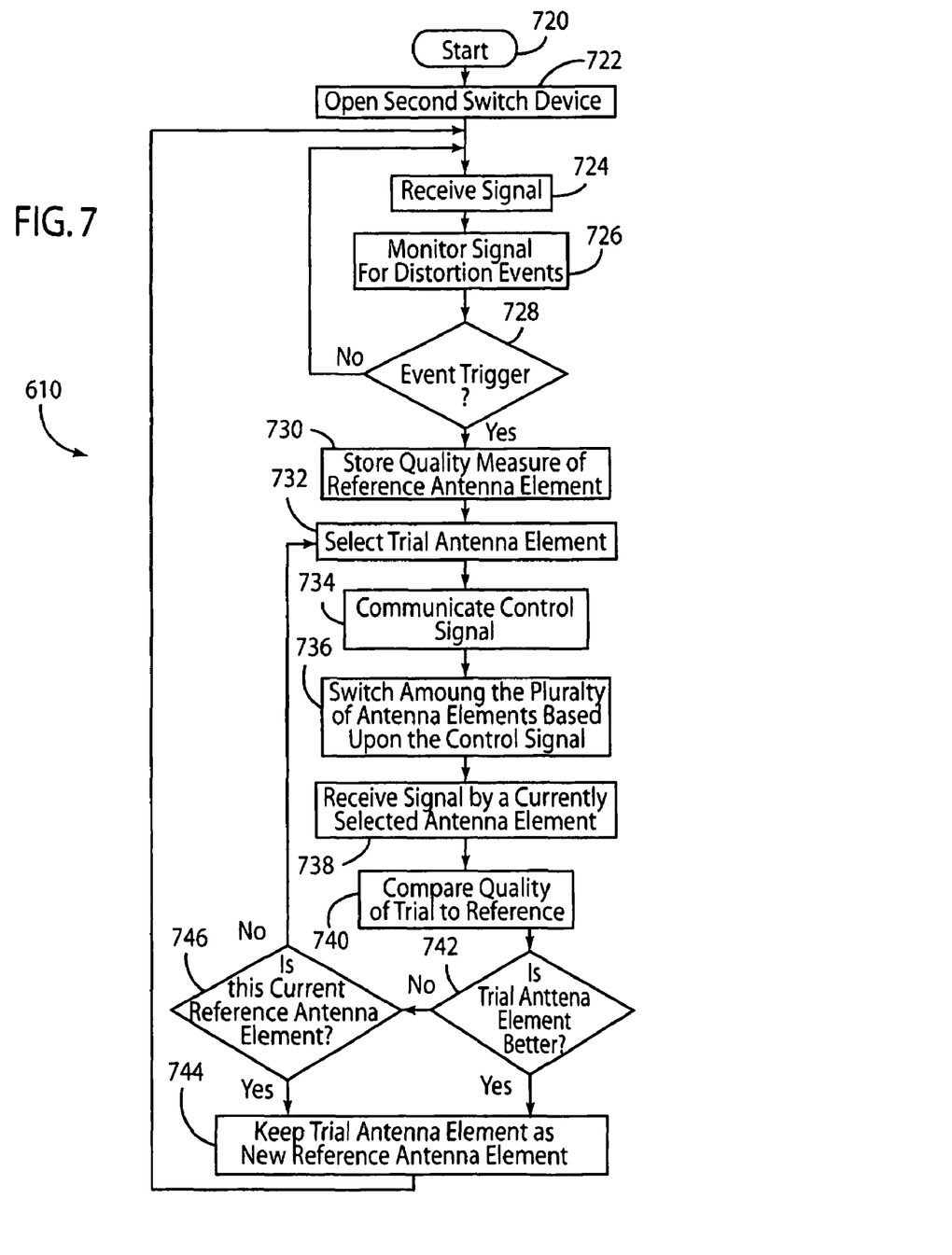
FIG. 7 is a flow chart illustrating a method of operating a receiver system in a first mode, in accordance with one embodiment of the present invention.

With respect to FIGS. 1, 2A, 2B, 6, and 7, the first mode of operation is generally shown, particularly in, FIG. 7 at reference identifier 610. The method of the first mode 610 starts at step 720, and proceeds to step 722, wherein the second switch device $S_{P1}, S_{P2}, \ldots S_{PN}$ is opened. At step 724, a signal is received. Typically, the signal is received by a currently selected antenna element, such that only one of the plurality of antenna elements is electrically connected to the receiver device 102 and receives the signal. This antenna element can then be referred to as the reference antenna element. At step 726, the signal received by the reference antenna is monitored for distortion effects. At decision step 728, it is determined if an event has been triggered. If it is determined at decision step 728 that an event has not been triggered then the method 610 returns to step 724, wherein the signal is received, and then monitored for distortion events at step 726. Thus, the signal being monitored is received by the same antenna element $A_1$, $A_2, \ldots A_N$ after the method 610 returns to step 724. However, if it is determined at decision step 728 that an event has been triggered, then the method 610 proceeds to step 730.

At step 730, the quality measure of the signal received by the reference antenna is stored and at step 732, a trial antenna is selected. The method 610 then proceeds to step 734, wherein a control signal is communicated. At step 736, the plurality of antenna elements $A_1, A_2, \ldots A_N$ are switched among based upon the control signal. At step 738, a signal is received by a currently selected antenna element. Typically, the signal being received by the currently selected antenna element at step 738 is the selected trial antenna. At step 740, the quality of the trial antenna element is compared to the quality of the reference antenna element.

The method 600 then proceeds to decision step 742, wherein it is determined if the quality of the trial antenna element is better than the quality of the signal received by the reference antenna element. If it is determined at decision step 742 that the signal received by the trial antenna element is better than the signal received by the reference antenna element, then the method 610 proceeds to step 744, wherein the trial antenna element now becomes the new reference antenna element. The method 610 then returns to step 724 to receive the signal with the new reference antenna element.

However, if it is determined at decision step 742 that the signal received by the trial antenna element is not better than the signal received by the reference antenna element, then the method 610 proceeds to decision step 746. At decision step 746, it is determined if the currently selected trial antenna element is the reference antenna element. If it is determined at decision step 746 that the current reference antenna element is the currently selected trial antenna element, then the method proceeds to step 744, wherein the trial antenna element is kept as the new reference antenna element. However, if it is determined at decision step 746 that the trial antenna is not the current reference antenna element, then the method 610 returns to step 732, wherein a trial antenna element is selected. It should be appreciated by those skilled in the art that the method 610 continues to be performed as long as the switched/phased system 106 is functioning in the first mode of operation based upon the method 600.

Figure 8:
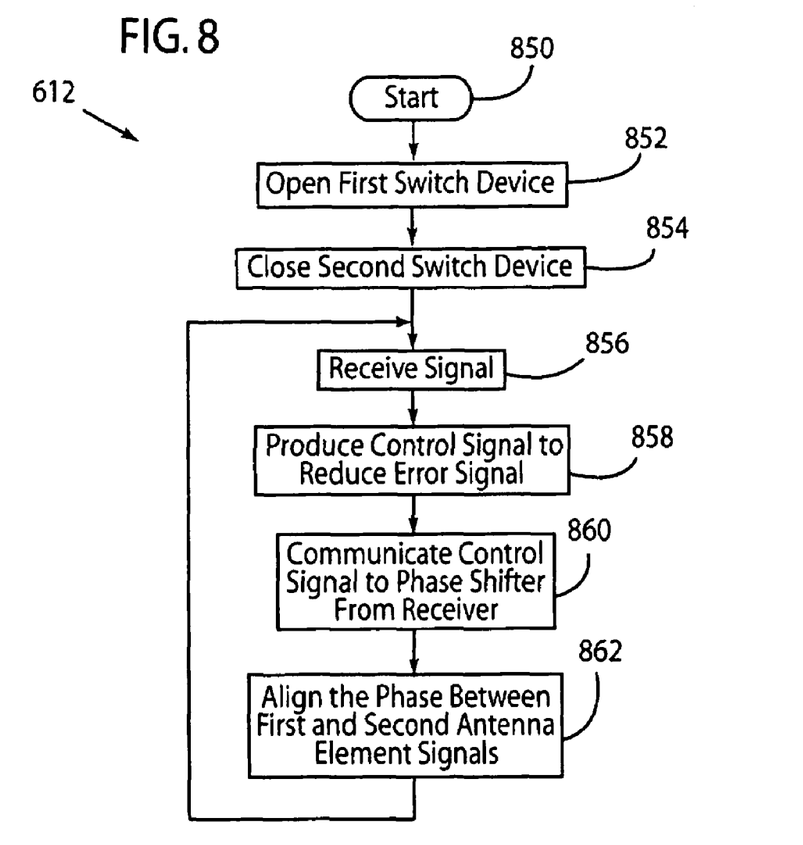
FIG. 8 is a flow chart illustrating a method of operating a receiver system in a second mode of operation, in accordance with one embodiment of the present invention.

As to FIGS. 1, 2A, 2B, 6, and 8, the second mode of operation is generally shown, particularly in, FIG. 8 at reference identifier 612. The method 612 starts at step 850, and proceeds to step 852, wherein the first switch device $S_1$, $S_2, \ldots S_N$ is open. At step 854, the second switch device $S_{P1}, S_{P2}, \ldots S_{PN}$ is closed. At step 856, a signal is received by a current antenna element combination, which can include one or more of the plurality of antenna elements $A_1, A_2, \ldots A_N$. At step 858, a control signal is produced to reduce error in the signal. Typically, the control signal is a phase difference. At step 860, the control signal is communicated to a phase shifter from the receiver device 102. At step 862, the phase between the signals received by the first antenna element $A_1$ and the second antenna element $A_2$ signals are aligned. The method 610 then returns to step 856, wherein the signal is received. It should be appreciated by those skilled in the art that the method 612 continues to be performed as long as the switched/phased system 106 is operating in a second mode of operation based upon the method 600.

Figure 9:
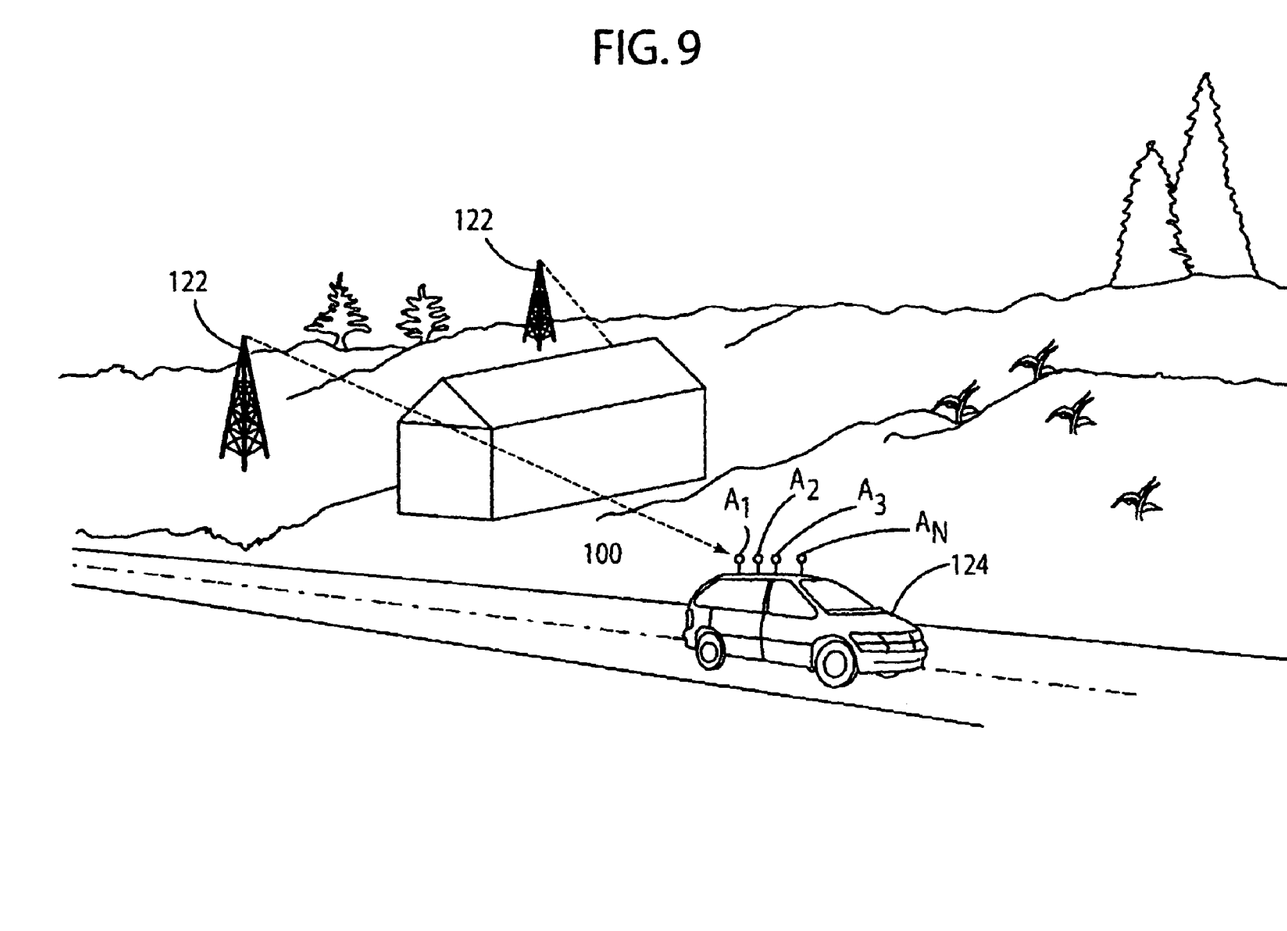
FIG. 9 is an environmental view of a receiver system, in accordance with one embodiment of the present invention.

Advantageously, the system 100 and method 600 can be utilized to receive a signal broadcasted by a service provider via a transmitter 122. The service provider can broadcast the signal from the transmitter 122 that is included in a terrestrial broadcast system or a satellite broadcast system, according to one embodiment. Thus, the receiver system 100 can switch between the first and second mode to maximize the reception of the signal with a greater signal quality. According to one embodiment, as shown in FIG. 9, the receiver system 100 can be used with a vehicle 124, so that as the receiver system 100 is mobile, the receiver system 100 can switch between modes to receive a broadcasted signal having a greater signal quality.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims, as interpreted according to the principles of patent law, including the doctrine of equivalents.

The invention claimed is:

1. A receiver system comprising:
a plurality of antenna elements configured to receive a transmitted signal;
a receiver device in communication with said plurality of antenna elements, said receiver device configured to emit one of an audio output and a video output based upon said received signal and said receiver device includes a controller that communicates a control signal that corresponds to a determined signal quality of said received signal; and a switch system that receives said control signal and is adapted to switch among said plurality of antenna elements to electrically connect at least one of said plurality of antenna elements to said receiver device in a plurality of modes based on said control signal, said plurality of modes including a first mode and a second mode, wherein said switch system comprises:

a first switch device including a first plurality of switches, said first switch device configured to operatively control the first plurality of switches so as to electrically connect at least one of said plurality of antenna elements with said receiver device when said switch system is in the first mode, and a second switch device including a second plurality of switches, said second switch device configured to operatively control the second plurality of switches so as to electrically connect at least one of said plurality of antenna elements with said receiver device when said switch system is in the second mode, wherein said controller commands said switch system to operate in the first mode utilizing said first switch device when said determined signal quality is above a threshold value, and said controller commands said switch system to operate in the second mode utilizing said second switch device when said determined signal quality is the same, or below the threshold value.

2. The system of claim 1, wherein said first mode is a switch diversity mode and said second mode is a phase diversity mode.

3. The system of claim 1, wherein when said switch system is operating in said first mode, said second switch device is in an open position, and said first plurality of switches of said first switch device alternatively actuate between open and closed positions to switch among said plurality of antenna elements.

4. The system of claim 3, wherein said first plurality of switches of said first switch device alternatively switch when a reference signal received by a reference antenna element of said plurality of antenna elements is below a second threshold value.

5. The system of claim 4, wherein when said first plurality of switches of said first switch device alternatively switch, a signal received by a currently selected antenna element of said plurality of antenna elements is compared to a signal received by said reference antenna element of the plurality of antenna elements.

6. The system of claim 5, wherein when said signal received by said currently selected antenna element is of greater signal quality than said signal received by said reference antenna element, said currently selected antenna element becomes said reference antenna element.

7. The system of claim 1, wherein when said switch system is operating in said second mode, said first switch device is in an open position, and at least portions of said second plurality of switches of said second switch device are in closed positions.

8. The system of claim 7, wherein said second plurality of switches of said second switch device are in closed positions so that the switch system electrically connects at least a portion of said plurality of antenna elements to said receiver device.

9. The system of claim 1, wherein said switch system is adapted to electrically connect some portion of said plurality of antenna elements to said receiver device.

10. The system of claim 1, wherein said receiver system is used within a vehicle.

11. The system of claim 1, further including,
a coaxial cable that electrically connects said switch system and said receiver device and electrically transmits said received signal therethrough.

12. The system of claim 11, wherein said received signal and said control signal are electrically transmitted through said coaxial cable.

13. The system of claim 1, wherein said switch system further includes,
a third switch device including a third plurality of switches that are different from the first plurality of switches of the first switch device and the second plurality of switches of the second switch devices, and the first, the second and the third switch devices of the switch system are configured to respectively operatively control, in combination, the first, the second and the third plurality of switches to allow a phase alignment in the switch system of a plurality of signals received through at least a portion of said plurality of antenna elements.

14. The system of claim 1, wherein the receiver device further includes,
a receiver front end,
an A/D converter electrically coupled to the receiver front end, and
a digital signal processing (DSP) device disposed intermediate the A/D convertor and the controller and respectively electrically coupled thereto.

15. The system of claim 14, wherein the DSP device outputs a processor control signal in relation to said determined signal quality that is electrically transmitted to an input of the controller, and the controller outputs said control signal that is received by the switch system that is in relation to said determined signal quality, and said control signal controls at least one of,
(i) the plurality of modes of the switch system, and
(ii) an alignment of a phase of signals received by the receiver system through at least a portion of the plurality of antenna elements.

16. The system of claim 14, wherein the switch system is in direct electrical downstream communication from the plurality of antenna elements and the receiver device is in direct electrical downstream communication from the switch system.

17. A receiver system comprising:
a plurality of antenna elements configured to receive a transmitted signal;
a receiver device in communication with said plurality of antenna elements, and configured to emit an output based upon said received signal, wherein said receiver device communicates a control signal that corresponds to a determined signal quality of said received signal;
a switch system adapted to switch among said plurality of antenna elements to electrically connect at least one portion of said plurality of antenna elements to said receiver device in a plurality of modes, wherein said switch system comprises:
a first switch device configured to electrically connect at least one of said plurality of antenna elements with said receiver device when said switch system is in a first mode, and a second switch device configured to electrically connect at least one of said plurality of antenna elements with said receiver device when said switch system is in a second mode; and a controller within the receiver device generates said control signal to said switch system, wherein said controller commands said switch system to operate in the first mode utilizing said first switch device when said determined signal quality is above a threshold value, and said controller commands said switch system to operate in the second mode utilizing said second switch device when said determined signal quality is below the threshold value, wherein when said switch system is operating in said second mode, said first switch device is in an open position and at least portions of switches of said second switch device are in closed positions, and wherein the control signal is produced to reduce error in said received signal such that said control signal is communicated from said receiver device to a phase shifter that aligns a phase between signals received by said electrically connected at least one portion of said plurality of antenna elements.

18. A method of receiving at least one signal in a receiver system, said method comprising the steps of:

providing the receiver system, the receiver system including a plurality of antenna elements, a switch system, and a receiver device includes a controller;

receiving said at least one signal by at least one antenna element of the plurality of antenna elements;

determining a signal quality of said received at least one signal by said receiver device;

communicating a control signal that corresponds to said determined signal quality to the switch system from the controller;

switching, in a plurality of modes, among said plurality of antenna elements by said switch system;

operating in a first mode of said plurality of modes as commanded by the controller based upon said control signal when said determined signal quality is above a threshold value; and operating in a second mode of said plurality of modes as commanded by the controller based upon said control signal when said determined signal quality is the same, or below the threshold value.

19. The method of claim 18, wherein said first mode is a switch diversity mode and said second mode is a phase diversity mode.

20. The method of claim 18, wherein the switch system includes a first switch device having a first plurality of switches and a second switch device having a second plurality of switches, and said step of operating in said first mode further includes, alternatively actuating said first plurality of switches of the first switch device between open and closed positions, and placing the second plurality of switches of the second switch device in open positions.

21. The method of claim 20, wherein said first plurality of switches of said first switch device are alternatively actuated when a reference signal received by a reference antenna element of said plurality of antenna elements is below a second threshold value.

22. The method of claim 21, wherein when said respective first plurality of switches of said first switch device alternatively switch, a signal received by a currently selected antenna element of said plurality of antenna elements is compared to said reference signal.

23. The method of claim 22, wherein when said signal received by said currently selected antenna element is of greater signal quality than said reference signal, the method further includes, selecting said currently selected antenna element as said reference antenna element by the switch system.

24. The method of claim 18, wherein said switch system includes a first switch device and a second switch device, and the second switch device includes a plurality of switches, said step of operating in said second mode further includes, switching the first switch device to an open position by the switch system, and switching at least a portion of said plurality of switches of said second switch device to a closed position by the switch system.

25. The method of claim 24 further including, electrically connecting at least one portion of said plurality of antenna elements to the receiver device when said plurality of switches of said second switch device are in closed positions, such that said received signal is received by said electrically connected at least one portion of said plurality of antenna elements.

26. A method of receiving at least one signal in a receiver system that includes a plurality of antenna elements, a switch system that includes a first switch device and a second switch device, and a receiver device, said method comprising the steps of:

receiving at least one signal by at least one of the plurality of antenna elements;

determining a signal quality of said received signal by the receiver device;

communicating a control signal that corresponds to said determined signal quality by the receiver device;

switching among said plurality of antenna elements that operate in a plurality of modes by the switch system;

operating the switch system in a first mode of said plurality of modes based upon said control signal when said determined signal quality is above a threshold value;

operating the switch system in a second mode of said plurality of modes based upon said control signal when said determined signal quality is below the threshold value, wherein said step of operating in said second mode further includes, switching the first switch device to an open position, and switching at least a portion of a plurality of switches of the second switch device to closed positions;

connecting at least a portion of said plurality of antenna elements to the receiver device when said plurality of switches of said second switch device are in said closed positions such that said received signal is received by said connected portion of said plurality of antenna elements; and producing the control signal to reduce error in said received signal, such that said control signal is communicated from said receiver device to a phase shifter that aligns a phase between signals received by said connected portion of said plurality of antenna elements.

* * * * *